United States Patent [19]

Shiozaki

[11] Patent Number: 4,907,020

[45] Date of Patent: Mar. 6, 1990

[54] DRIVING CIRCUIT FOR AN INK JET RECORDING HEAD HAVING RESISTOR ELEMENTS RESPECTIVELY CONNECTED PARALLEL TO THE ELECTROTHERMAL CONVERTING ELEMENTS

[75] Inventor: Atsushi Shiozaki, Hiratsuka, Japan

[73] Assignee: Canon Kabushiki Kaisha, Tokyo, Japan

[21] Appl. No.: 171,483

[22] Filed: Mar. 21, 1988

[30] Foreign Application Priority Data

Mar. 31, 1987 [JP] Japan .................................. 62-76354

[51] Int. Cl.[4] .......................... G01D 15/16; B41J 3/04

[52] U.S. Cl. .................................... 346/140 R; 361/58

[58] Field of Search ...................... 346/140; 361/58, 56

[56] References Cited

U.S. PATENT DOCUMENTS

| | | | |
|---|---|---|---|
| 4,353,079 | 10/1982 | Kawanabe | 346/140 |
| 4,550,327 | 10/1985 | Miyakawa | 346/140 |
| 4,720,716 | 1/1988 | Ikeda | 346/140 |
| 4,768,125 | 8/1988 | Byrne | 361/58 X |
| 4,802,054 | 1/1989 | Yu | 361/58 X |

*Primary Examiner*—Joseph W. Hartary

*Attorney, Agent, or Firm*—Fitzpatrick, Cella, Harper & Scinto

[57] ABSTRACT

A driving circuit for an ink jet recording head that includes electrothermal converting elements for causing liquid emission by thermal energy. Electric energy is supplied to the electrothermal converting elements for actuation. Resistor elements are respectively and electrically connected parallel to the electrothermal converting elements for the purpose of reducing the influence of the capacitative component of the electrothermal converting elements to a negligible level, thereby suppressing electric current through the ink.

25 Claims, 3 Drawing Sheets

DRIVING CIRCUIT FOR AN INK JET RECORDING HEAD HAVING RESISTOR ELEMENTS RESPECTIVELY CONNECTED PARALLEL TO THE ELECTROTHERMAL CONVERTING ELEMENTS

BACKGROUND OF THE INVENTION

1. Field of the Invention

The present invention relates to an ink jet recording head for image recording by liquid emission and a driving circuit therefore, and more particularly to an ink jet recording head for achieving liquid emission by thermal energy, and a driving circuit therefor.

2. Related Background Art

Such an ink jet recording head has conventionally been prepared by forming, as shown in FIG. 1, liquid path forming members, a cover plate, etc. on a substrate having electrothermal converting elements, as disclosed for example in U.S. Pat. Nos. 4,410,899, 4,723,129, 4,417,251 and 4,509,063. Such an ink jet recording head is provided with plural liquid paths 3,3 . . . having orifices 2,2, . . . at the ends thereof; electrothermal converting elements 4,4, . . . ; and a common liquid chamber 5 communicating with said liquid paths.

FIG. 2 shows a driving circuit for such ink jet recording head, wherein said electrothermal converting elements 4,4, . . . are respectively connected to switching circuits 6,6, . . . which are selectively activated by a signal $S_{on}$ to supply an electric current to desired electrothermal converting elements 4,4, . . . to emit liquid ink from the orifices 2 as disclosed in U.S. Pat. Nos. 4,345,262 and 4,429,321.

However, such conventional ink jet recording head and driving circuit therefor may cause a problem when the electrothermal converting element of any of the liquid paths 3 is destructed. In such destructed state, the destructed electrothermal converting element 4 itself often contacts the ink in the liquid path, thus causing a current in the ink whereby the destructed heat-generating resistor has a capacitative component.

Consequently a square voltage wave applied in the normal state as shown in FIG. 3 will be distorted as shown in FIG. 4 in such destructed state.

As will be apparent from FIG. 4, the destructed electrothermal converting element will receive a voltage close to DC voltage, thus inducing an electrode reaction. In this manner the destruction of an electrothermal converting element 4 generates reaction products in the ink by the quasi-DC voltage, and such impurities in the ink composition may flow into other liquid paths through the common liquid chamber, thus clogging the orifices and the liquid paths and eventually deteriorating the performance of the entire recording head or totally disabling the recording head.

SUMMARY OF THE INVENTION

An object of the present invention is to resolve the above-mentioned drawback and to provide an ink jet recording head and a driving circuit therefor, capable of preventing deterioration in performance.

Another object of the present invention is to provide a driving circuit for an ink jet recording head, provided with electrothermal converting elements for causing liquid emission by thermal energy, resistor elements respectively connected parallel to the electrothermal converting elements, and wiring for supplying electric energy to the electrothermal converting elements.

Still another object of the present invention is to provide an ink jet recording head provided with orifices for liquid emission, electrothermal converting elements provided respectively corresponding to the orifices and used for generating thermal energy for causing liquid emission, and resistor elements electrically connected parallel to the electrothermal converting elements.

DETAILED DESCRIPTION OF THE PREFERRED EMBODIMENTS

Now the present invention will be clarified in detail by embodiments thereof shown in the attached drawings.

Figure 1:
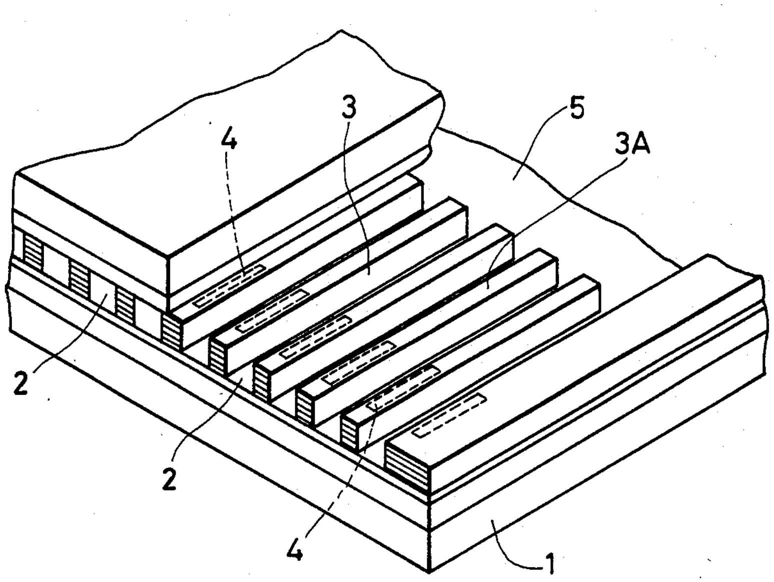
FIG. 1 PRIOR ART
FIG. 1 is a partially cut-off perspective view of a conventional ink jet recording head.
Figure 2:
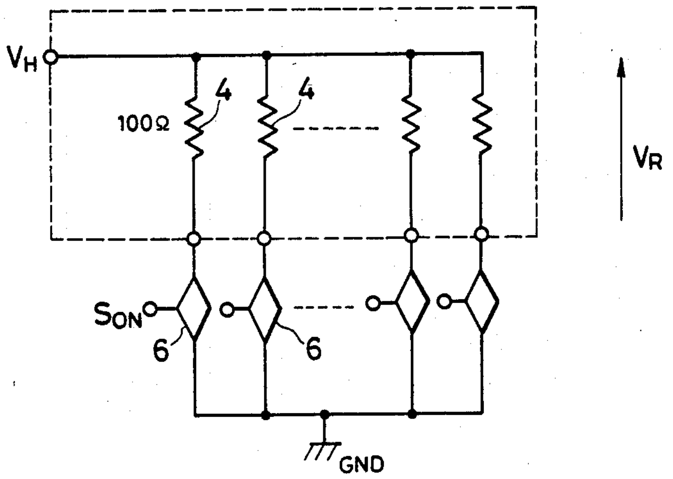
FIG. 2 PRIOR ART
FIG. 2 is a circuit diagram of a driving circuit for the conventional ink jet recording head.
Figure 3:
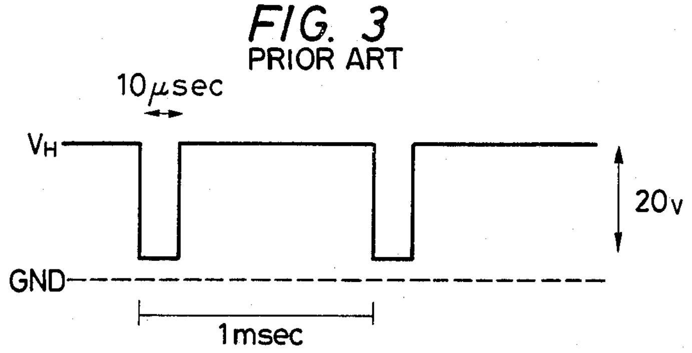
FIG. 3 PRIOR ART
FIG. 3 is a chart showing the driving voltage for the driving circuit of FIG. 2.
Figure 4:
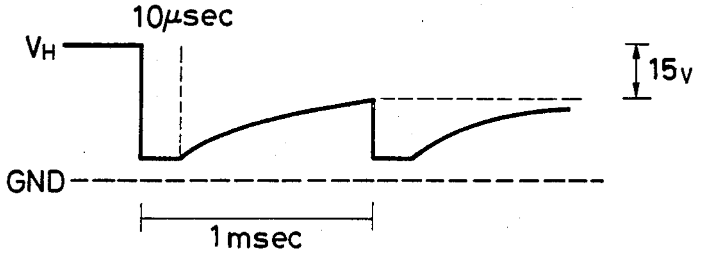
FIG. 4 PRIOR ART
FIG. 4 is a chart showing the diriving voltage when the heat-generating element is destructed.
Figure 5:
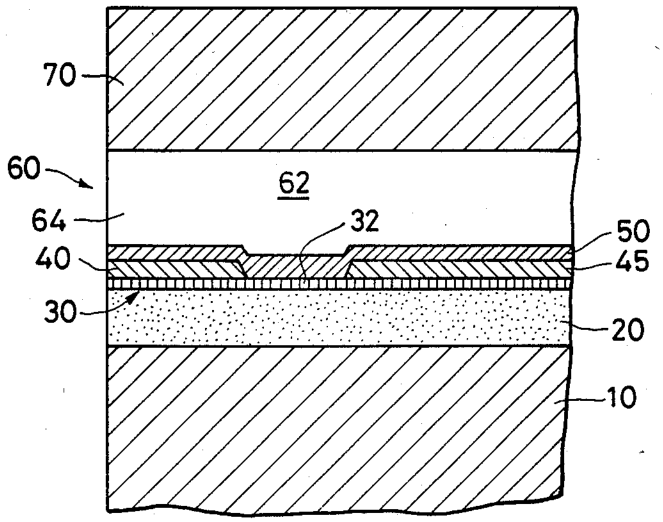
FIG. 5 is a cross-sectional view of an ink jet recording head embodying the present invention.

FIG. 5 is a schematic cross-sectional view of an ink jet recording head embodying the present invention, for facilitating the understanding thereof. It will, however, be understood that the structure shown in FIG. 5 is a mere example for facilitating the understanding of the present invention and other structures may likewise be applicable to the present invention. In FIG. 5, there are shown a silicon substrate 10; a substrate layer 20 composed of silicon oxide ($SiO_2$); a heat generating resistor 30 composed of hafnium boride ($HfB_2$) and patterned on the substrate layer 20; and electrodes 40,45 electrically connected to the heat generating resistor 30 and composed of a conductive material such as aluminum.

There are further shown a protective insulating layer 50 which is formed on the resistor 30 and the electrodes 40, 45 and which may be dispensed with if necessary; a liquid path wall 60 formed, for example with a resinous material to define a liquid path 62 and a discharge port or an orifice 64 at an end; and a cover plate 70 composed of glass.

In such a recording head, when an electric current is supplied between the electrodes 40, 45 by a switching circuit 36 to be explained later, heat is generated in a heat generating portion 32 between the electrodes 40, 45 in the heat generating resistor 30, thereby generating bubbles in the ink and thus causing ink emission.

Figure 6:
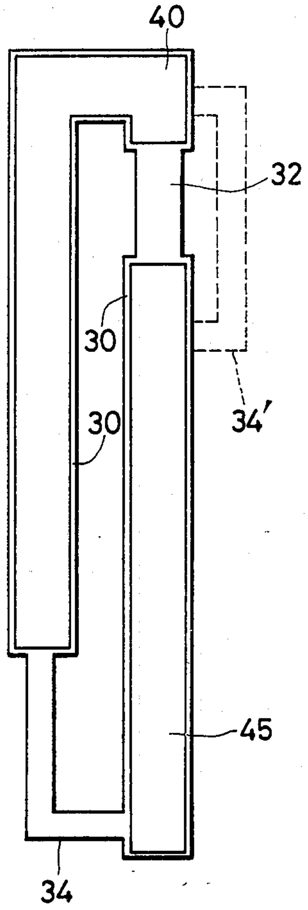
FIG. 6 is a plan view showing a pattern of heat generating resistors embodying the present invention.

FIG. 6 is a plan view of a preferred embodiment of the ink jet recording head of the present invention, seen at the level of the heat generating resistor 30.

Figure 7:
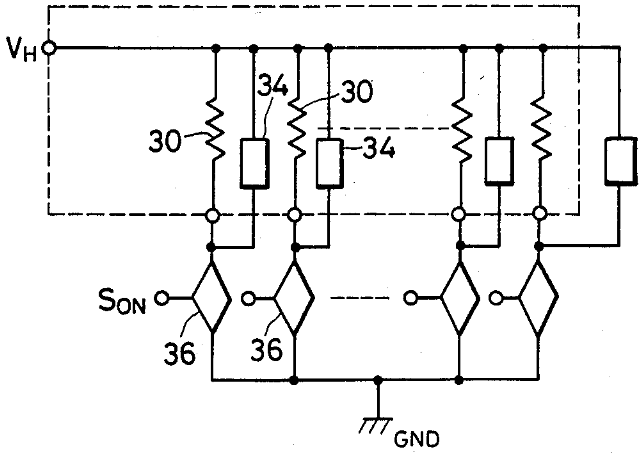
FIG. 7 is a diagram of a driving circuit embodying the present invention.

In FIG. 6, the heat generating resistor layer 30 is formed in a rectangular frame pattern by an etching process, and the electrodes 40, 45 are formed thereon to define the heat generating portion 32 therebetween, which is positioned in the aforementioned liquid path. The electrode 40 is connected to a voltage source $V_H$ through an unrepresented lead wire, while the electrode 45 is grounded through an unrepresented wire in the switching circuit 36 as shown in FIG. 7. A parallel resistor 34 (composed of so-called pure resistor) is provided parallel to the heat generating portion 32 of the heat generating resistor 30.

The resistance of the heat generating portion 32 is selected in the order of 100 Ω, while that of the parallel resistor 34 is selected sufficiently larger, in the order of 1–100 kΩ in order not to interfere with the bubble formation in the normal function of the heat generating portion 32 and in order not to exceed the resistance, which is in the order of 10–100 kΩ of the heat generating portion 32 when it is destructed. However, this resistance need not be larger than the resistance of the electrothermal converting element if the parallel resistor does not hinder the bubble formation. The resistance when the heat generating element is destructed varies by various factors such as ink, but a parallel resistor having a smaller resistance than the above-mentioned resistance at the destruction may be employed. In the present embodiment, the heat generating resistor 30 is composed of hafnium boride, and the parallel resistor 34 is formed with a width of 10 μm and a length of 500 μm in order to obtain the above-mentioned resistance. In the present embodiment, the heat generating resistor 30 including the parallel resistor 34 can be composed of the same material in a simple rectangular pattern, without an increase in the manufacturing cost and without undersirable affect on the nozzle pitch.

If there is a space in the nozzle pitch, the parallel resistor may naturally be positioned closer to the heat generating portion 32, as indicated by broken lines 34' in FIG. 6 instead of the aforementioned parallel resistor 34. Also instead of forming the parallel resistor with the heat generating layer, the parallel resistor may be formed by patterning the electrode layer if it can be formed sufficiently thin to obtain the above-mentioned resistance. It is furthermore possible to form another layer for the parallel resistor and to pattern the layer for forming the resistor electrically parallel to the heat generating portion 32, through such method requires an additional process step. Also the material of the parallel resistor is not limited to the material of the present embodiment, but can be any high resistance material such as metal oxides, for example titanium oxide (TiO) or vanadium oxide (VO). Also other materials such as metals, thermets, alloys and metal compounds may be employed for this purpose.

The above-explained driving circuit for the ink jet recording head is not affected by the capacitative component of the heat generating portion 32 due to the presence of the parallel resistor 34 when the heat generating portion 32 is destructed, thus suppressing current through the ink. For example, in a pulse with a duration of 10 μsec and a repeating cycle of 1 msec, the current could be reduced to about 1/100.

As explained in the foregoing, the present embodiment is capable, when any of the electrothermal converting elements is destructed, of reducing the influence of the capacitative component of the electrothermal converting element to a negligible level, due to the presence of a resistor element connected parallel to the heat generating portion of the electrothermal converting element, thereby suppressing the electric current through the ink.

It is therefore rendered possible to prevent the formation of reaction products, thereby preventing the block of other liquid paths and orifices.

As will be apparent from the foregoing explanation, the present invention reduces the formation of reaction products in the ink even when one of the plural heat generating resistors is destructed, thereby avoiding the deterioration of the performance of the entire recording head.

Consequently, the destruction of a heat generating resistor and the disruption of current flow therethrough do not significantly affect the recording operation or in case the recording operation cannot be interrupted, it is possible to continue the recording operation without undesirable effect on the entire recording head.

I claim:

1. A driving circuit for an ink jet recording head having a liquid path for retaining liquid to be discharged from the head, comprising:

an electrothermal converting element corresponding to the liquid path for applying sufficient thermal energy to liquid in the liquid path to cause fluid discharge when electric current flows through said electrothermal converting element, said electrothermal converting element being subject to disruption of the current flow therethrough;

wiring for supplying said electrothermal converting element with an electric current to cause liquid discharge; and a resistance element connected to said wiring in parallel with said electrothermal converting element for receiving the electric current supplied to said electrothermal converting element, wherein said resistance element applies insufficient thermal energy to liquid in the liquid path to cause liquid discharge when the electric current is supplied to said electrothermal converting element and said resistance element provides a path for the electric current to suppress current flow through liquid in the liquid path when current flow through said electrothermal converting element is disrupted.

2. An ink jet recording head comprising:

a plurality of liquid paths for retaining liquid;

a common liquid chamber for supplying liquid to said liquid paths;

discharge ports communicating with said liquid paths for discharging liquid;

electrothermal converting elements corresponding to respective said liquid paths for applying sufficient thermal energy to liquid in said liquid paths to cause liquid discharge from said discharge ports when electric current flows through said electrothermal converting elements, said electrothermal converting elements being subject to disruption of the current flow therethrough;

wiring for supplying said electrothermal converting elements with an electric current to cause liquid discharge from said discharge ports; and resistance elements each connected to said wiring in parallel with a corresponding said electrothermal converting element for receiving the electric current supplied to said corresponding electrothermal converting element, wherein said resistance elements apply insufficient thermal energy to liquid in said liquid paths to cause liquid discharge when the electric current is supplied to said electrothermal converting elements and each said resistance element provides a path for the electric current to suppress current flow through liquid in said liquid paths when current flow through said corresponding electrothermal converting element is disrupted.

3. An ink jet recording head according to claim 2, wherein said resistance elements are formed on a substrate with said electrothermal converting elements.

4. An ink jet recording head according to claim 2, wherein said resistance elements and said electrothermal converting elements have resistor portions made of the same material.

5. An ink jet head according to claim 2, wherein said resistance elements are formed by patterning the same material as electrode portions of said electrothermal converting elements.

6. An ink jet recording head according to claim 2, wherein said resistance elements are provided proximate to heat generating portions of said electrothermal converting elements.

7. An ink jet recording head according to claim 2, wherein said resistance elements are composed of a metal compound.

8. An ink jet recording head according to claim 7, wherein said metal compound is one of a metal oxide and a metal alloy.

9. An ink jet recording head according to claim 2, wherein said resistance elements comprise cermet.

10. An ink jet recording head according to claim 2, wherein said head has a protective layer on said electrothermal converting elements and said resistance elements.

11. An ink jet recording head according to claim 2, wherein said electrothermal converting elements have a predetermined electrical resistance and the electrical resistance said resistance elements is greater than that of said electrothermal converting elements when current flow therethrough is not disrupted and smaller than that of said electrothermal converting elements when current flow therethrough is disrupted.

12. An ink jet recording head having a liquid path for retaining liquid to be discharged from the head, comprising:

an electrothermal converting element having a predetermined resistance and corresponding to the liquid path for applying sufficient thermal energy to liquid in the liquid path to cause liquid discharge when electric current flows through said electrothermal converting element, said electrothermal converting element being subject to disruption of the current flow therethrough;

wiring for supplying said electrothermal converting element with an electric current to cause liquid discharge; and a resistance element having an electrical resistance greater than that of said electrothermal converting element and being connected to said wiring in parallel with said electrothermal converting element for receiving the electric current supplied to said electrothermal converting element, wherein said resistance element applies insufficient thermal energy to liquid in the liquid path to cause liquid discharge when the electric current is supplied to said electrothermal converting element and said resistance element provides a path for the electric current to suppress current flow through liquid in the liquid path when current flow through said electrothermal converting element is disrupted.

13. An ink jet recording head according to claim 12, wherein the resistance of said resistance element is smaller than that of said electrothermal converting element when current flow therethrough is disrupted.

14. An ink jet recording head according to claim 12, wherein plural said electrothermal converting elements are provided, each corresponding to one of plural said resistance elements.

15. An ink jet recording head according to claim 12, wherein said electrothermal converting element is provided on a substrate with said resistance element.

16. An ink jet recording head according to claim 12, wherein said electrothermal converting element and said resistance element are made of the same material.

17. An ink jet recording head according to claim 12, wherein said resistance element is provided proximate to a heat generating portion of said electrothermal converting element.

18. An ink jet recording head according to claim 16, wherein said resistance element and said electrothermal converting element each have a heat generating resistive layer and a pair of electrodes electrically contacting said heat generating resistive layer.

19. An ink jet recording head comprising:

a plurality of liquid paths for retaining liquid;

a common liquid chamber for supplying liquid to said liquid paths;

discharge ports communicating with said liquid paths for discharging liquid;

electrothermal converting elements having a predetermined resistance and corresponding to respective said liquid paths for applying sufficient thermal energy to liquid in said liquid paths to cause liquid discharge from said discharge ports when electric current flows through said electrothermal converting elements, said electrothermal converting elements being subject to disruption of the current flow therethrough;

wiring for supplying said electrothermal converting elements with an electric current to cause liquid discharge from said discharge ports; and resistance elements having an electrical resistance greater than that of said electrothermal converting elements and each being connected to said wiring in parallel with a corresponding said electrothermal converting element for receiving the electric current supplied to said corresponding electrothermal converting element, wherein said resistance elements apply insufficient thermal energy to liquid in said liquid paths to cause liquid discharge when the electric current is supplied to said electrothermal converting elements and each said resistance element provides a path for the electric current to suppress current flow through liquid in said liquid paths when current flow through said corresponding electrothermal converting element is disrupted.

20. An ink jet recording head according to claim 19, wherein the resistance of said resistance elements is smaller than that of said electrothermal converting elements when current flow therethrough is disrupted.

21. An ink jet recording head according to claim 19, wherein one of said electrothermal converting elements is provided corresponding to each said resistance element.

22. An ink jet recording head according to claim 19, wherein said electrothermal converting elements are provided on a substrate with said resistance elements.

23. An ink jet recording head according to claim 19, wherein said electrothermal converting elements and said resistance elements are made of the same material.

24. An ink jet recording head according to claim 19, wherein said resistance elements are provided proximate to heat generating portions of said electrothermal converting elements.

25. An ink jet recording head according to claim 23, wherein said resistance elements and said electrothermal converting elements each have a heat generating resistive layer and a pair of electrodes electrically contacting said heat generating resistive layer.

* * * * *

UNITED STATES PATENT AND TRADEMARK OFFICE

CERTIFICATE OF CORRECTION

PATENT NO. : 4,907,020

DATED : March 6, 1990

INVENTOR(S) : ATSUSHI SHIOZAKI

It is certified that error appears in the above-identified patent and that said Letters Patent is hereby corrected as shown below:

COLUMN 1

Line 12, "therefore," should read --therefor,--.

COLUMN 2

Line 18, "diriving voltage" should read --driving voltage--.

COLUMN 3

Line 41, "through" should read --though--.
Line 47, "thermets," should read --cermets,--.

COLUMN 5

Line 33, "said" should read --of said--.

Signed and Sealed this

Eighth Day of October, 1991

*Attest:*

HARRY F. MANBECK, JR.

*Attesting Officer*

*Commissioner of Patents and Trademarks*